United States Patent [19]

Ralston, Jr. et al.

[11] E Patent Number: Re. 32,065

[45] Reissued Date of Patent: Jan. 14, 1986

[54] MOLDED COLLAPSIBLE SOLUTION CONTAINER

[75] Inventors: Philip G. Ralston, Jr., Lindon, Utah; Joe A. Miller, Lake Zurich; Frank Cammarata, III, Palatine, both of Ill.

[73] Assignee: Baxter Travenol Laboratories, Inc., Deerfield, Ill.

[21] Appl. No.: 76,691

[22] Filed: Sep. 18, 1979

Related U.S. Patent Documents

Reissue of:

[64] Patent No.: 4,049,033
Issued: Sep. 20, 1977
Appl. No.: 621,095
Filed: Oct. 9, 1975

U.S. Applications:

[62] Division of Ser. No. 526,092, Nov. 21, 1974.

[51] Int. Cl.[4] ..... B65D 1/02

[52] U.S. Cl. ..... 604/408; 222/107; 383/9; 383/67; 383/120; 604/202

[58] Field of Search ..... 150/0.5; 222/107; 604/408

[56] References Cited

U.S. PATENT DOCUMENTS

| | | | |
|---|---|---|---|
| 1,370,264 | 3/1921 | Bachmann | 222/107 |
| 2,792,149 | 5/1957 | Lutz | 222/107 |
| 3,081,002 | 3/1963 | Tauschinski | 150/0.5 X |
| 3,211,342 | 10/1965 | Miles | 222/107 |
| 3,260,412 | 7/1966 | Larkin | 222/107 |
| 3,353,714 | 11/1967 | Trecek | 264/293 X |
| 3,589,422 | 6/1971 | Bellamy | 150/1 |
| 3,595,441 | 7/1971 | Grosjean | 150/0.5 X |
| 3,810,503 | 5/1974 | Lewis | 150/8 |
| 3,915,212 | 10/1975 | Bujan | 150/8 |
| 3,921,630 | 11/1975 | McPhee | 222/107 X |

*Primary Examiner*—Donald F. Norton
*Attorney, Agent, or Firm*—Paul C. Flattery; Garry Ellis; John P. Kirby, Jr.

[57] ABSTRACT

A molded collapsible solution container, which is made from a tubular, plastic parison, defines a body portion having an integral neck portion and shoulder portion at one end thereof. The container is sealed at its opposite end. The body portion defines, in as-molded configuration, a generally oval cross-section taken perpendicular to the axis of the container, adjacent the neck and shoulder portion. The cross-section tapers progressively to a flat configuration at the end of the container opposite to the neck and shoulder portion, which facilitates a uniform manner of flat collapsing of the container progressively from the opposite end toward the end adjacent the neck and shoulder portion as the contents thereof are withdrawn through the neck portion, when the container is disposed in neck downward position.

13 Claims, 11 Drawing Figures

Fig. 1.
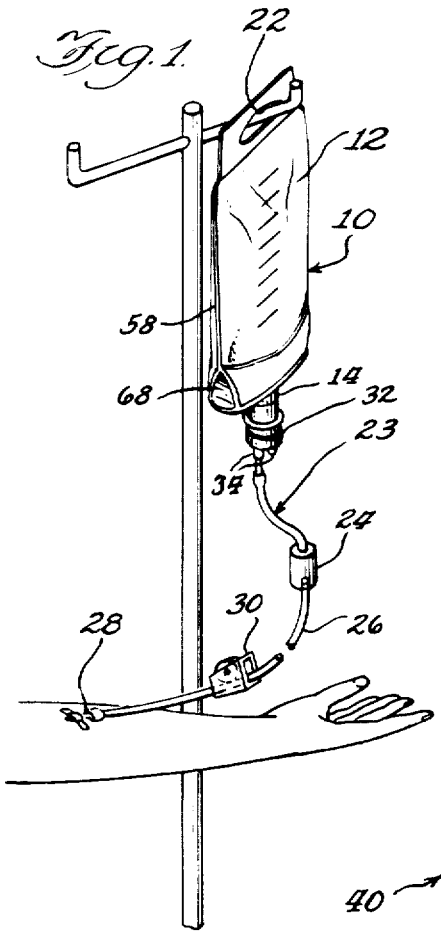
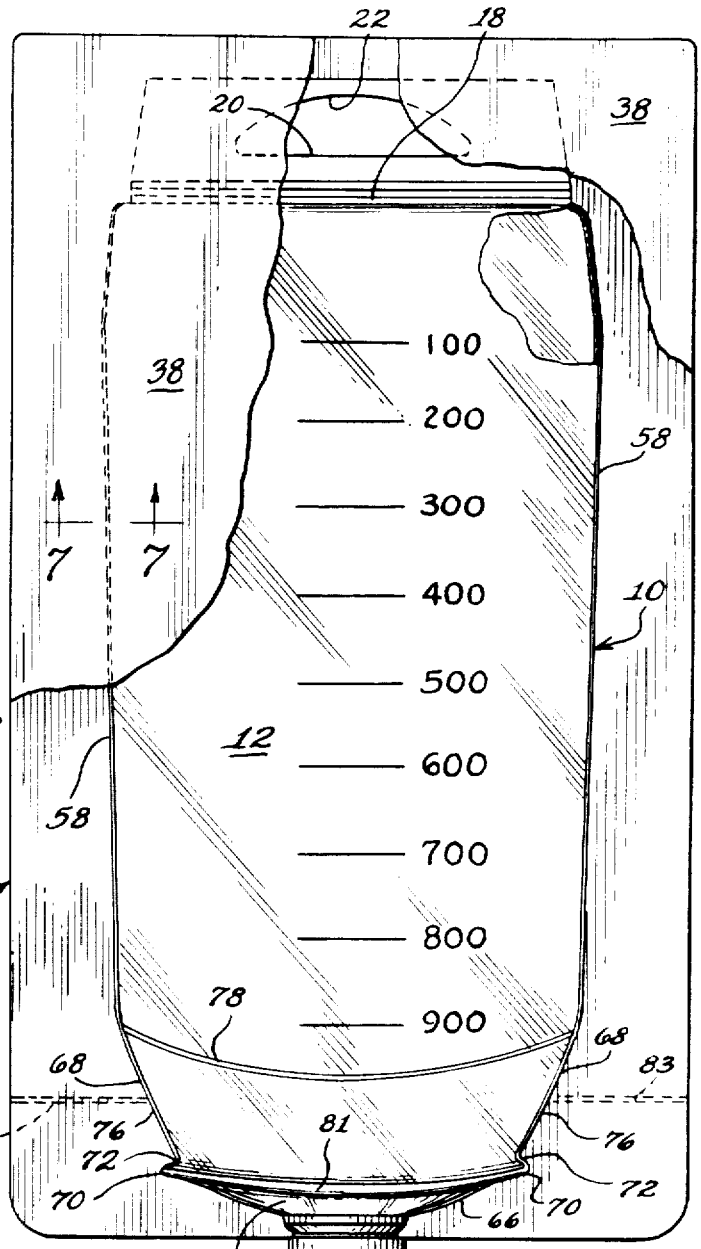
Fig. 2.
Fig. 3.
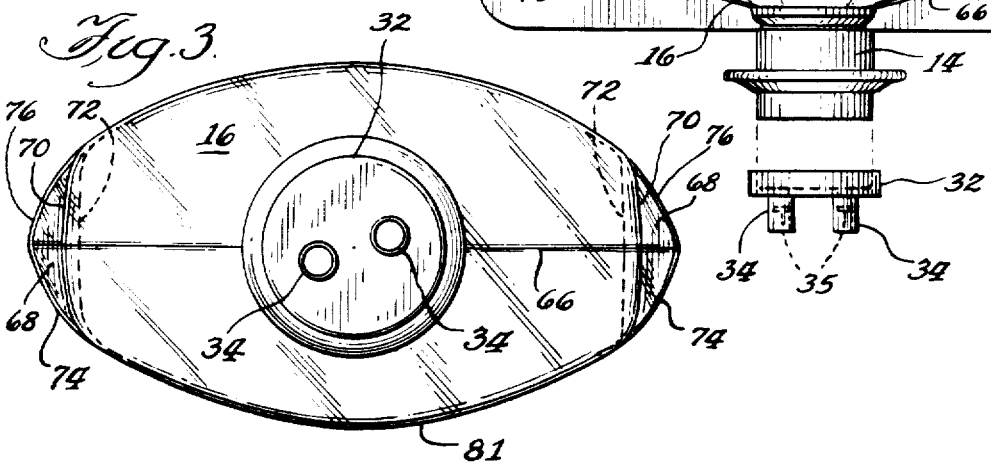

Fig. 4.
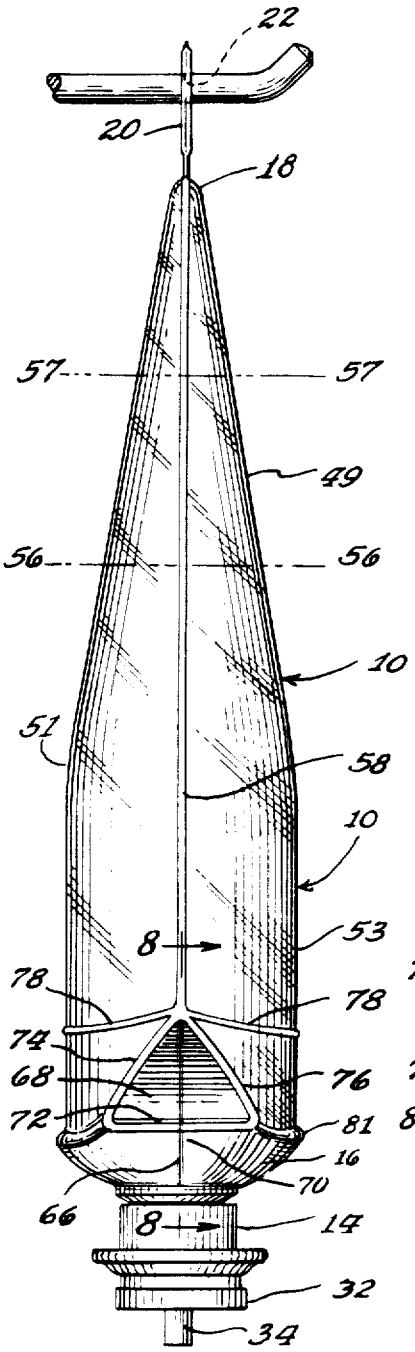
Fig. 5.
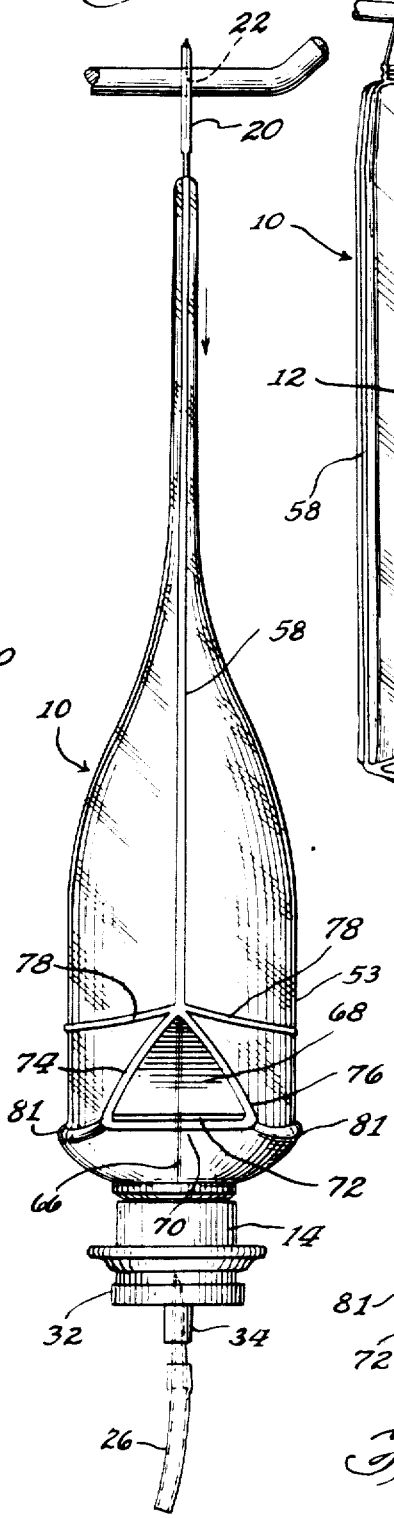
Fig. 6.
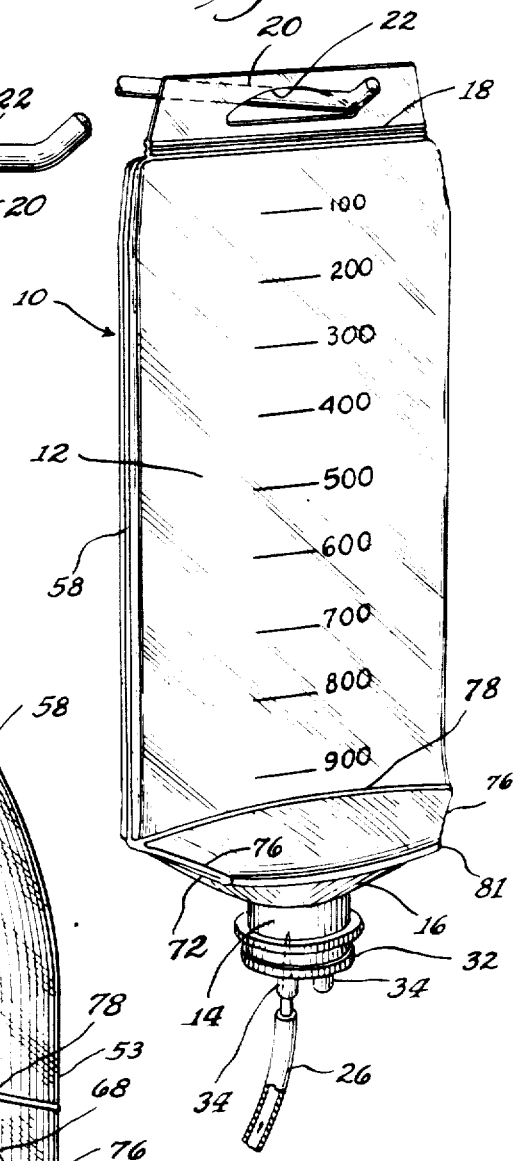
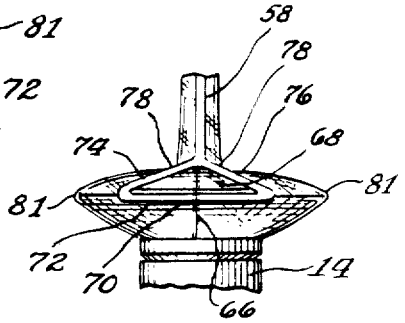
Fig. 6A.

MOLDED COLLAPSIBLE SOLUTION CONTAINER

Matter enclosed in heavy brackets [ ] appears in the original patent but forms no part of this reissue specification; matter printed in italics indicates the additions made by reissue.

This application is a division of application Ser. No. 526,092 filed Nov. 21, 1974.

BACKGROUND OF THE INVENTION

Flexible plastic parenteral solution containers are presently sold by Travenol Laboratories, Inc. under the trademark VIAFLEX ®. These containers have many substantial advantages over glass bottles of parenteral solution, particularly in their reduced weight, lack of susceptibility to breakage, and freedom from the need to allow air to bubble into the solution container as it drains.

The presently available plastic parenteral solution bags are made of a pair of flat sheets of polyvinyl chloride plastic, heat-sealed at their edges to form a sealed, sterile container. In the past, various attempts have been made to replace the heat-sealed plastic solution containers with blow molded containers. However, one drawback to the use of such blow molded containers is the fact that, when hung from one end with solution being drawn out of them from the other end, they tend to collapse in an incomplete manner. This is particularly so when hydrocarbon polymers, e.g., polyolefins such as polypropylene, are used.

The reason for this incomplete collapse is that the stiffness of a thin-walled polypropylene container frequently tends to resist collapse to such a degree that the moderate suction pressure exerted on the container by weight of the fluid in an administration set attached to the container is insufficient to cause its complete collapse.

Another disadvantage of the prior art solution containers made from blow-molded parisons is that they tend to collapse in a non-uniform manner. On some occasions these devices, which are generally oval in shape, collapse along the long axis of their oval cross-section, but on other occasions they tend to collapse along both the short axis of the cross-section as well as the long axis. As a result of this, it becomes quite difficult for a nurse to determine exactly how much solution has passed out of the solution container.

In accordance with this invention, a collapsible parenteral solution container is provided which can advantageously be made of stiffer, more desirable plastic material such as polypropylene, while still being readily collapsible in normal therapeutic use as a dispenser of parenteral solution. Also, the novel container of this invention collapses in a uniform manner, which simplifies the determination of the amount of fluid remaining in the container at any time. Likewise, the container collapses more completely under normal suction exerted by the suction head of solution in the administration set.

Also, the container of this invention can be more economically produced by the novel mold of this invention in a blow-molding process than the flat, heat-sealed sheet type solution containers of the prior art.

DESCRIPTION OF THE INVENTION

In accordance with this invention, a molded, collapsible solution container is made from a tubular plastic parison. The container defines a body portion having an integral neck portion and shoulder portion at one end thereof, and is sealed the opposite end. The body portion defines, in as-molded configuration, a generally oval, transverse cross-section adjacent the neck and shoulder portion, which cross-section tapers progressively to a flat configuration at the end of the container opposite to said one end as defined above. This facilitates a uniform manner of flat collapse of the container progressively from its opposite end toward the one end as defined above, as the contents of the container are withdrawn through the neck portion, when said container is disposed in a neck-downward position.

It is particularly preferred that, in the collapsible solution containers of this invention, the circumferences of the transverse cross-sections defined by a major portion of the length of the container are essentially constant, which facilitates the flat collapse of the container of this invention.

Furthermore, the solution container of this invention preferably defines a pair of longitudinal lines of flexing weakness defined in diametrically opposite relation to each other at the extremes of the long axis of the oval cross-sections defined above, for further facilitating of the flat collapse. Also, the plane of the flat, opposite end of this container is generally parallel to the long axis of the oval cross-sections of the container.

The collapsible solution container of this invention is preferably made of a polyolefin plastic such as polypropylene, since these materials can be formulated to have an extremely low content of substances which can leach into solutions carried by the container. Also, the polyolefins are quite inexpensive, and possess many other desirable characteristics such as strength, high softening temperature (to permit autoclaving of the flexible containers), and the like.

In the drawings, one preferred specific embodiment of the solution container of this invention is shown.

FIG. 1 is a perspective view of a collapsible solution container of this invention in use for administering parenteral solution to a patient.

FIG. 2 is an inverted, elevational view of the solution container of this invention in as-molded configuration, resting in the mold used to manufacture the container, with portions of the mold broken away to show the solution container inside.

FIG. 3 is a plan view of the solution container of this invention, showing the neck and shoulder portions thereof.

FIG. 4 is an elevational view of the solution container of FIG. 2, inverted in its typical position of use.

FIG. 5 is an elevational view similar to FIG. 4, after approximately one-half of the liquid contents have been removed from the solution container.

FIG. 6 is a perspective view after essentially all of the liquid contents have been removed from the container of this invention, showing how the bottom of the container collapses under the influence of a normal suction of a column of parenteral solution in an attached administration set.

FIG. 6A is a fragmentary elevational view of the shoulder portion of the container of FIG. 6.

Figure 7:
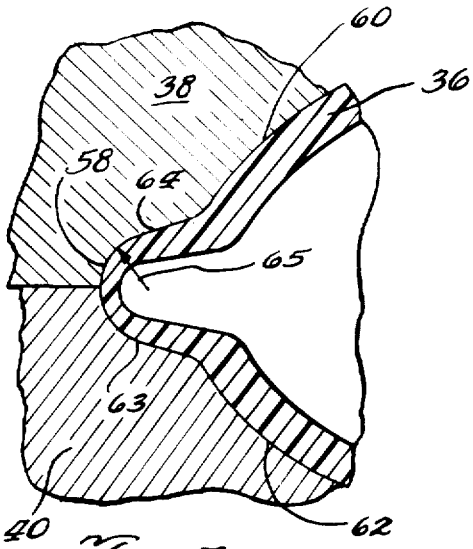
FIG. 7 is a sectional view taken along line 7—7 of FIG. 2.

Referring to the drawings, a molded, collapsible solution container 10 is disclosed which defines a body portion 12 having an integral neck portion 14 and shoulder portion 16 of one end thereof. Neck and shoulder portions 14, 16 are preferably relatively stiff, while the rest of the container is flexible and collapsible. Container 10 is sealed at its end 18 opposite the neck and shoulder portions 14, 16, and includes a flattened portion 20 having a hanger hole 22 so that the container may be hung up in the manner illustrated in FIG. 1 for convenient administration of parenteral solution or any other material as desired.

FIG. 1 schematically shows such an administration operation, in which an administration set 23, conventionally including a drip chamber 24 and flexible tubing 26, connects the interior of container 10 with an infusion needle 28 in the arm of a patient, for flow of parenteral solution from container 10 to an arm vein in a manner controlled by flow clamp 30.

Neck portion 14 of container 10 is proportional to receive a cap portion 32, which may be attached to the neck portion by heat welding or the like. Cap portion 32 is generally made of semi-rigid plastic, and is shown to contain a pair of tubular access ports 34 which, prior to opening, are occluded by diaphragms 35 across the bores of the tubular ports. Accordingly, container 10 is opened by inserting a sterile, hollow spike of an administration set into one of the access ports 34 to rupture the diaphragm. The spike is selected to be proportioned for sealing, sliding contact with the interior of port 34, so that solution passes only through the hollow spike and into the administration set 23.

The other of the two access ports 34 may carry a latex injection site for the administration of supplemental medication or the like to the contents of container 10.

As shown in FIG. 2, container 10 is typically molded without cap 32, the cap being added later.

Figure 10:
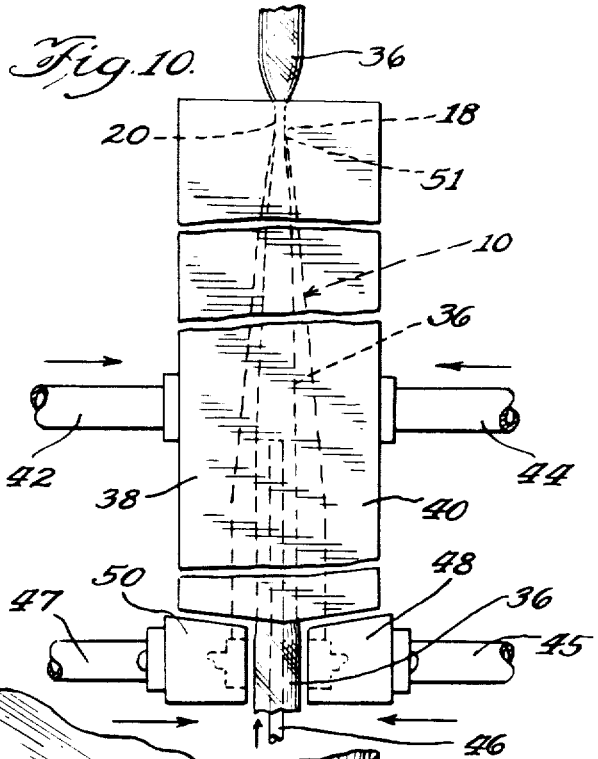
FIG. 10 is a schematic, elevational view showing how the mold of this invention is used in a blow molding operation to manufacture the container of FIG. 2.
Figure 8:
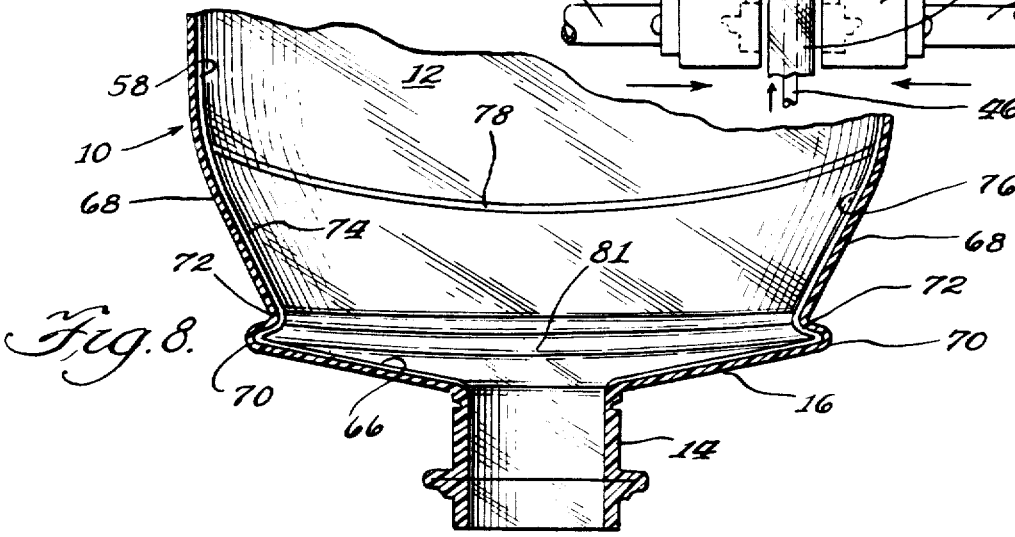
FIG. 8 is an enlarged, fragmentary, elevational view, taken in longitudinal section, of part of the container of FIG. 2 when under the condition of FIG. 5.

FIG. 10 schematically shows a blow molding apparatus which is used to manufacture the collapsible container of this invention. Blow molding in general is a well developed arm of technology, and many different techniques of blow molding are currently available to those skilled in the art, and useable for manufacturing the containers of this invention. In particular, the well-known Orbet process, which is available under license from the Phillips Petroleum Company of Bartlesville, Oklahoma, is a highly suitable manufacturing process for the container of this invention.

A tubular parison 36 of hot, molten plastic is extruded in a conventional manner and lowered into mold halves 38, 40, and neck mold portions 48, 50, which are then brought together by pistons 42, 44, 45, 47. A blowing tube 46 is introduced into the mold at an appropriate time during the process, and air is introduced to expand the hot parison outwardly until it is stretched to match the configuration of the interior of closed mold halves 38, 40. The formed container within mold halves 38, 40 is allowed to cool. Thereafter, blow tube 46 may be withdrawn; the molds opened; and the container ejected.

Flattened portion 20 is formed by an end of mold halves 38, 40 as shown in FIG. 10.

Accordingly, the flexible container of this invention, in as-molded configuration, assumes the novel shape of the mold cavity shown herein in FIGS. 2 and 10, with that shape being more fully disclosed in FIGS. 3, 4, 7 and 8.

After cooling, the respective mold halves are opened, and container 10, exhibiting the as-molded configuration shown in the previously mentioned figures, is removed.

In accordance with this invention, the solution container, in as-molded configuration, defines a generally oval, transverse cross-section adjacent the neck and shoulder portions 14, 16 as generally shown in FIG. 3. As shown in FIG. 4, this cross-section tapers progressively in container section 49 to generally flat configuration at the end 18 of the container which is opposite from the end having neck and shoulder portions 14, 16. In this specific embodiment, the tapered section 49 begins at point 51, being spaced from shoulder portion 16 by an optional length of parallel walled container section 53, which preferably extends less than half of the container length, so that section 49 constitutes a major portion of the container.

The purpose of tapered section 49 is to facilitate a uniform manner of flat collapse of the container progressively from end 18 towards the neck and shoulder end of the container, as the contents thereof are withdrawn through neck portion 14, when the container is disposed in neck-downward position. This effect is progressively illustrated in FIGS. 4, 5 and 6.

The container of this invention thus collapses reliably in a uniform manner, which permits the nurse to accurately judge how much parenteral solution has been expended from the collapsible container by no more than a quick glance, rather than having to manipulate the bag or carefully examine it, as is the case in the prior art flexible containers.

The shape of the bag of FIG. 4 is idealized, in that the specific shape shown shows the bag in as-molded condition for purposes of illustration. Actually, the pressure of the liquid in the container would cause the inverted container of FIG. 4 to be a little fatter at the bottom, and thinner at the top, than is shown in that figure.

It can be seen from FIG. 2 that the lateral edges 58 of container 10 are not parallel, but diverge slightly over most of their length in the direction running from the end of the container carrying neck 14, to end 18. This is an aspect of the shape of the container 10 which causes, along a major portion of the length of the container, the circumferences of all axially perpendicular, transverse cross-sections to be essentially constant.

Accordingly, as container 10 gets thinner in its transverse dimension (illustrated in FIG. 4) as one moves toward end 18, it correspondingly becomes wider in its lateral dimension as shown in FIG. 2 as one moves toward the same end 18. As a result, the peripheral length or circumferences of most transverse cross-sections, perpendicular to the container's longitudinal axis, will be essentially constant. For example, transverse sections 56 and 57 will be essentially uniform in peripheral length or circumference.

The wall thickness of the polypropylene containers of this invention preferably varies from about 0.02 to 0.01 inch. It is generally preferable for the wall thickness at end 18 to be about 0.01 inch, with the wall thickness increasing gradually to a maximum of about 0.02 inch in the area of shoulder portion 16.

Furthermore, a pair of longitudinal lines of flexing weakness 58 are defined along both lateral container edges, to further facilitate the flat collapse of container 10. A cross-sectional detailed view of line of flexing weakness 58 is illustrated in FIG. 7, along with the corresponding structure of mold halves 38, 40. As expanding tubular parison 36 comes into contact with the walls of mold halves 38, 40, it tends to quickly cool and harden. The expanding parison first encounters mold halves 38, 40 at areas 60, 62, and in those areas the parison hardens quickly and becomes immobile. However, the mold halves define cutaway portions 63, 64 in which the parison can still expand, and in so doing, it reduces its wall thickness as indicated. Eventually, the parison fills the cut-away area 63, 64, but here its expansion has formed a linear portion of circular or U-shaped cross-section having a minimum wall thickness therein of 0.002 or 0.003 inch less than the surrounding wall thickness. Accordingly, a line of flexing weakness 58 is formed in the circular or U-shaped cross-section. The radius 65 of the circular or U-shaped cross-section may be about 3/64 inch.

The plane of flat end 18 of container 10 is preferably parallel to the long axis 66 of the oval shoulder area 16 as shown in FIG. 3. This also facilitates uniform, flat collapse.

Generally triangular gusset portions 68 are provided adjacent shoulder portion 16, and in recessed relation thereto, so that shoulder tips 70 protrude outwardly from the gusset portions. Each gusset portion 68 is bounded by three side portions 72, 74, 76, each of which define lines of flexing weakness which may have a structure similar to lines of flexing weakness 58. However, line 72 defines an angle pointing inwardly toward the interior of the bag, while lines 74 and 76 may be lines of weakness having an outwardly pointing, circular or U-shaped cross-sectional structure similar to that shown in FIG. 7. Lines of weakness 72, 74, 76 may be formed by appropriate grooves in the mold halves (for forming lines 74, 76) and appropriate ridges in the mold half for forming line of flexing weakness. All of the lines of flexing weakness 58, 72, 74 and 76 may simply constitute crease lines molded into the bag wall by appropriate grooves or ridges in the mold. Any suitable crease line which permits angular variation between sections of the bag walls may be utilized in this invention.

Figure 9:
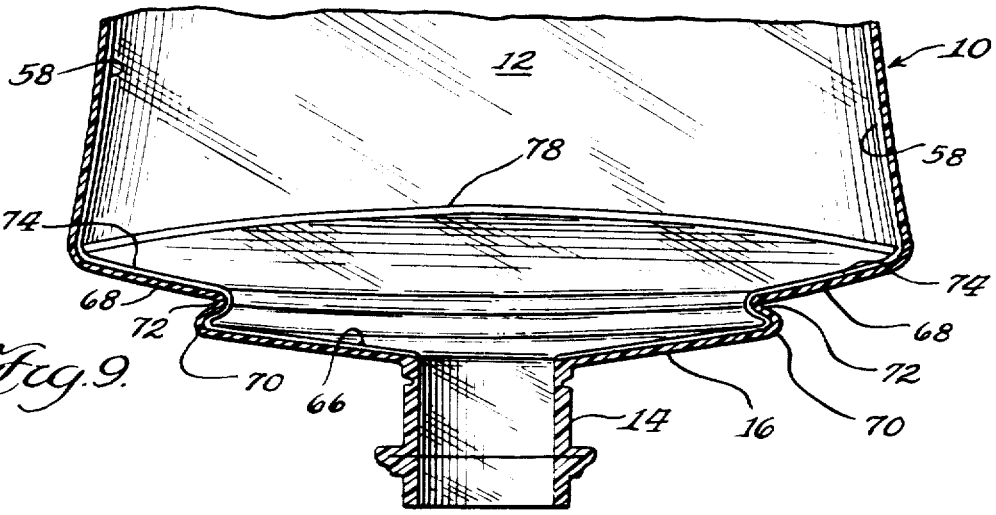
FIG. 9 is an enlarged, fragmentary, elevational view, taken in longitudinal section, of part of the container of FIG. 2 when under the condition of FIG. 6.

The gusset structure permits the further collapse under normal suction pressure of the type exerted within the container due to the weight of the solution in administration set 26 and the normal elevation of the container as used. The container collapses both longitudinally and laterally in the region of gusset 68, adjacent shoulders 16, which further reduces the volume of the collapsed container, and permits the expulsion of more parenteral solution. This is particularly illustrated by FIGS. 6A and 9, when compared with FIGS. 5 and 8.

The side edges of shoulder portion 16 each define a transverse line of folding weakness 81 which facilitates the collapse of the container of this invention as particularly illustrated in FIGS. 6 and 6A. Mold halves 38 and 40 desirably contain vent channels 83 which communicate with the respective grooves in its mold half which form the various lines of flexing weakness, particularly those grooves which are not on the parting line of the mold as are cutaway areas 63, 64. Vents 83 permit air to escape from grooves formed in the mold halves to define various lines of weakness, so that the lines of weakness in the container wall can expand more fully into the grooves which are so formed.

Transversely disposed, circumferential line of weakness 78 is an optional, additional line of flexing weakness which can be used to facilitate the inward collapsing of the bag walls adjacent shoulder portion 16, as illustrated in FIG. 6. It may also be molded in the manner of FIG. 7, or any other desired manner.

The flexible container of this invention can be easily molded, filled with parenteral solution or any other desired product and sterilized if necessary by autoclaving, particularly when the container of this invention is made of a high melting plastic such as polypropylene. When the contents are drained from the inverted container, the container collapses in a uniform manner to permit the accurate measurement of the amount of the solution withdrawn from the container, even though the container includes less residual air than has been previously required in order to conveniently read the amount of liquid expended from the container.

The above has been offered for illustrative purposes only, and is not intended to limit the invention of this application, which is as defined in the claims below.

[That which is claimed is:] *I claim:*

1. A molded, collapsible solution container, which container defines a chamber-defining body portion wall having an integral neck portion and shoulder portion at one end thereof, and is sealed at its end opposite said one end, the improvement comprising: in combination, said shoulder portion being generally oval, said body portion defining, in its normal, unstressed state, a generally oval, transverse cross-section adjacent said neck and shoulder portion, said cross-section tapering progressively along a major portion of its length to a flat, sealed end portion at said end of the container opposite to said one end and extending in the direction of the longitudinal axis of the container, to facilitate a uniform manner of flat collapse of said container progressively from said opposite end towards said one end as the contents thereof are withdrawn through said neck portion, when said container is disposed in neck-downward position, the chamber end opposite to said one end being tapered sufficiently narrowly to permit essentially all of the chamber-defining wall of the body portion adjacent said chamber end to collapse flat together upon said withdrawal of the contents.

2. A molded, collapsible solution container which container defines a chamber-defining body portion wall, an integral neck portion and a shoulder portion at one end thereof, and is sealed at its end opposite said one end, the improvement comprising: in combination, said shoulder portion being generally oval, said body portion defining, in its normal, unstressed state, a generally oval, transverse cross-section adjacent said neck and shoulder portion, said cross-section tapering progressively along a major portion of the body portion length to a flat, sealed end portion at said end of the container opposite to said one end and extending in the direction of the longitudinal axis of the container, to facilitate a uniform manner of flat collapse of said container progressively from said opposite end towards said one end as the contents thereof are withdrawn through said neck portion, when said container is disposed in neck-downward position, the chamber end opposite to said one end being tapered sufficiently narrowly to permit essentially all of the chamber-defining walls of the body portion adjacent said chamber end to collapse flat together upon said withdrawal of the contents, the thickness of the wall of said body portion adjacent the chamber end opposite to said one end being less than the thickness of the wall of said chamber-defining body portion adjacent said shoulder portion.

3. The collapsible solution container of claim 2 in which, along a major portion of the length of said container, the circumferences of all transverse cross-sections are essentially constant, to facilitate flat collapse.

4. The collapsible solution container of claim 3 in which a pair of longitudinal lines of flexing weakness are defined in diametrically opposite relation to each other, to facilitate flat collapse.

5. The collapsible solution container of claim 4 in which a portion of said container adjacent said one end is of uniform, generally oval, transverse cross-section, and said major portion of said container is positioned nearest said opposite end, the plane of said flat, opposite end being generally parallel to the long axis of said oval cross section.

6. The collapsible solution container of claim 5 which is made of polypropylene film.

*7. A molded collapsible solution container, which container defines a chamber-defining body portion wall having an integral neck portion and shoulder portion at one end thereof, and is sealed at its end opposite said one end, the improvement comprising, in combination: the combination of said shoulder portion and body portion adjacent the shoulder portion defining, in its normal, unstressed state, a structure generally elongated in one transverse dimension, the transverse cross section of said body portion tapering progressively along a major portion of its length to a flat, sealed end portion at said end of the container opposite to said one end and, the direction of tapering extending in the direction of the longitudinal axis of the container, to facilitate a uniform manner of flat collapse of said container progressively from said opposite end toward said one end as the contents thereof are withdrawn through said neck portion, when said container is disposed in neck-downward position, the chamber end opposite to said one end being tapered sufficiently narrowly to permit essentially all of the chamber-defining wall of the body portion adjacent said chamber end to collapse flat together upon said withdrawal of the contents.*

*8. The molded collapsible solution container of claim 7 in which the thickness of the wall of said body portion adjacent the chamber end opposite to said one end is less than the thickness of the wall of said chamber-defining body portion adjacent said shoulder portion.*

*9. The molded, collapsible solution container of claim 7 in which a pair of generally triangular gusset portions are provided adjacent said shoulder portion at opposite ends of said generally elongated structure, said gusset portions having lines of flexing weakness to facilitate the collapse of said container under normal suction pressure.*

*10. The molded, collapsible solution container of claim 7 which is made of polypropylene.*

*11. A molded collapsible solution container which container defines a chamber-defining body portion wall having an integral neck and shoulder portion at one end thereof and is sealed at its end opposite said one end, the improvement comprising, in combination:*

*the combination of such shoulder portion and the body portion adjacent the shoulder portion defining, in its normal unstressed state, a structure generally elongated in one transverse dimension, the transverse cross section of said body portion tapering progressively along a major portion of its length to a flat, sealed end portion at said end of the container opposite to said one end, the direction of tapering extending in the direction of the longitudinal axis of the container, to facilitate a uniform manner of flat collapse of said container progressively from said opposite end toward said one end as the contents thereof are withdrawn through said neck portion, when said container is disposed in a neck-downward position, the chamber end opposite to said one end being tapered sufficiently narrowly to permit essentially all of the chamber-defining wall of the body portion adjacent said chamber end to collapse flat together upon withdrawal of the contents;*

*a pair of generally triangular gusset portions being provided adjacent said shoulder portion at opposite ends of said generally elongated structure, said gusset portions having lines of flexing weakness to facilitate the collapse of said container under normal suction pressure, and opposed side edges of said shoulder portion between said gusset portions each defining a transverse line of folding weakness to facilitate the collapse of said container.*

*12. The collapsible solution container of claim 11 which is made of polypropylene.*

*13. The collapsible solution container of claim 11 in which the thickness of the wall of said body portion adjacent the chamber end opposite to said one end is less than the thickness of the wall of said chamber-defining body portion adjacent said shoulder portion.*

* * * * *